(12) United States Patent
Cooper et al.

(10) Patent No.: US 7,511,764 B2
(45) Date of Patent: Mar. 31, 2009

(54) DIGITAL CAMERA SYNCHRONIZATION

(76) Inventors: Alan Neal Cooper, 482 Harris St., Coppell, TX (US) 75019; Christopher Michael Fritz, 6965 Aspen Creek La., Dallas, TX (US) 75252; James Walter Exner, 2000 Liverpool, Plano, TX (US) 75025

( * ) Notice: Subject to any disclaimer, the term of this patent is extended or adjusted under 35 U.S.C. 154(b) by 748 days.

(21) Appl. No.: 10/202,668

(22) Filed: Jul. 24, 2002

(65) Prior Publication Data

US 2004/0017486 A1     Jan. 29, 2004

(51) Int. Cl.
*H04N 9/475* (2006.01)
*H04N 5/06* (2006.01)
*H04N 9/45* (2006.01)
*H04N 9/455* (2006.01)

(52) U.S. Cl. .................. 348/516; 348/512; 348/521

(58) Field of Classification Search ............ 348/207.1, 348/207.11, 521, 159, 512, 513, 514, 516, 348/517, 536, 537, 539, 547, 548
See application file for complete search history.

(56) References Cited

U.S. PATENT DOCUMENTS

| 5,249,051 | A | * | 9/1993 | Elberbaum et al. | 348/521 |
| 5,450,140 | A | * | 9/1995 | Washino | 348/211.11 |
| 5,689,313 | A | * | 11/1997 | Sotheran | 348/513 |
| 5,926,209 | A | * | 7/1999 | Glatt | 348/211.9 |
| 5,995,140 | A | * | 11/1999 | Cooper et al. | 348/512 |
| 6,009,305 | A | * | 12/1999 | Murata | 348/211.5 |
| 6,330,027 | B1 | * | 12/2001 | Haba | 348/211.99 |
| 6,493,025 | B1 | * | 12/2002 | Kiriyama et al. | 348/207.1 |
| 6,493,034 | B1 | * | 12/2002 | Elberbaum | 348/512 |
| 6,573,931 | B1 | * | 6/2003 | Horii et al. | 348/211.9 |
| 2005/0146611 | A1 | * | 7/2005 | Vu et al. | 348/207.1 |

* cited by examiner

*Primary Examiner*—Lin Ye
*Assistant Examiner*—Jason Whipkey
(74) *Attorney, Agent, or Firm*—Jackson Walker LLP.

(57) ABSTRACT

The present invention provides a synchronization system comprising a base unit and at least one video camera. The base unit includes a master time-base adapted to set a time period that samples a frame of video data, a memory, and a base unit communications transceiver. The base unit communications transceiver is adapted to transmit a frame synchronization signal to a video camera communications transceiver. The video camera includes an image sensor adapted to store the video data, an exposure control adapted to control an exposure level of the image sensor, and a camera time-base adapted to receive the frame synchronization signal from the video camera communications transceiver. The camera time-base is further adapted to receive the frame synchronization signal, reset its time and initiates its internal timing sequence, transmit signals to the exposure control to control a length of the exposure, and transmit timing signals to the image sensor to read the video data.

10 Claims, 7 Drawing Sheets

DIGITAL CAMERA SYNCHRONIZATION

RELATED APPLICATIONS

The present invention is related to patent application Ser. No. 10/202,283 titled DIGITAL OBSERVATION SYSTEM, to patent application Ser. No 10/202,968 titled DIGITAL TRANSMISSION SYSTEM, and to patent application Ser. No. 10/202,257 titled UNIVERSAL SERIAL BUS DISPLAY UNIT. These applications are commonly assigned, commonly filed, and are incorporated by reference herein.

FIELD OF THE INVENTION

The present invention relates to synchronizing frames of video data and, more particularly, to synchronizing time-variant video frames from multiple digital video cameras with a base unit.

BACKGROUND OF THE INVENTION

In conventional video systems, there are two primary requirements for generating a video signal. The first requirement requires a scene to be sampled by a video camera on a periodic basis at a frequency high enough so that when video (comprising the scene) is displayed back to the user, it is perceived as continuous video. Therefore, the samples should be close enough in time and consistent enough such that a user perceives the video as a fluid motion.

The second requirement is that an exposure of an image sensor in the video camera be such that an amount of light impinging on the sensor is within a dynamic range of the sensor and that a level of the exposure is consistent over short periods of time. As such, the light level from frame to frame should be constant so that the video level is constant and does not exhibit a "flicker" caused by exposure variations of the image sensor. The exposure level of the image sensor is controlled either by controlling the amount of light impinging on the image sensor by a mechanical iris or shutter control or by controlling the integration time for the photosites by electronic signals controlling the image sensor (electronic iris control). The electronic iris control is the most economical method and the one preferred in lower cost systems where the cost of mechanical iris systems are deemed too expensive.

The electronic iris mode of controlling the sensor's integration time by electronic signals to the image sensor usually depends on a time-base of the video camera to set the time period for the exposure control. Therefore, the integration time for the image sensor is based on, and a percentage of, the frame or field time of the video camera. This is utilized because the video camera is usually the master time-base of the system where the display is slaved to the time-base set by the video camera. In such a mode, the time-base is constant. There are applications which require the video camera to be a slave device to other time-bases but in these systems, the video camera depends on the master time-base to be sufficiently constant to enable the video camera to properly perform the electronic iris function. In these systems, the camera time-base is usually slaved to the master by use of circuits like Phase Lock Loops (PLL) where the master clock of the video camera is slowly adjusted so that the slave and the master system have the same line or frame period. This technique also depends on the master time-base to be sufficiently constant so that the PLL will stay locked to the master.

Therefore, it is desirable for the present invention to overcome the limitations of conventional video systems that require a consistent time-base for exposure control to generate a video signal and furthermore, enabling independence between the scene sampling rate and the electronic exposure control system. It is also desirable to have the video camera be a slave device to another dynamic master time-base.

SUMMARY OF THE INVENTION

The present invention achieves technical advantages as a system and method for synchronizing multiple video cameras with a base unit over a network where communications are packet based transmissions with non-deterministic characteristics. The video camera allows a scene temporal sampling to be separated from an exposure control of the video camera to allow for time variations incurred in the synchronization process.

In an exemplary embodiment, a synchronization system comprises a base unit and a video camera (or cameras). The base unit includes a master time-base adapted to set a time period that samples a frame of video data, a memory, and a base unit communications transceiver. The base unit communications transceiver is adapted to transmit a frame synchronization signal to a video camera communications transceiver. The video camera includes an image sensor adapted to store the video data, an exposure control adapted to control an exposure level of the image sensor, and a camera time-base adapted to receive the frame synchronization signal from the video camera communications transceiver. The camera time-base is further adapted to receive the frame synchronization signal, reset its time and initiate its internal timing sequence, transmit signals to the exposure control to control a length of the exposure, and transmit timing signals to the image sensor to read the video data.

DETAILED DESCRIPTION OF THE INVENTION

In an exemplary embodiment of the present invention, the two requirements of consistent scene sampling and consistent exposure control are separated in such a manner that a video camera can generate quality video when synchronized to a master system that communicates with a method that has relatively large variations in its period. It is important to note that the variation is not from the source or master time-base, but from the communications method not being deterministic.

The time variation that can be tolerated in the period of the scene sampling is greater than the time variation that can be tolerated in the exposure control because the electronic iris control circuits at certain times will use very short integration periods for the image sensor which may vary by a large percentage if referenced to the incoming master synchronization signals. As such, the camera's scene sampling is referenced to the master system's synchronization signals but the camera internally generates a separate system for the exposure control of the image sensor. Therefore, the video camera will set the point of time when the exposure starts by the synchronization signal from the master, but will use the internal time-base of the video camera to control the length of the exposure. As such, the video camera becomes a "one-shot" system where the start of a frame is controlled by the external synchronization and all other aspects of the video camera are controlled by an internal time-base.

This type of scene sampling system can be utilized in digital systems because once the video data is transferred to the base unit and stored in a base unit memory, the video camera's time-base will be converted to the base unit's time-base which will eliminate any time variations which occurred. It is important to note, however, that the video camera must be complete with its internal time-base functions by the time the next external synchronization occurs from the base unit. As such, the time period for the video camera to complete its frame must be less than a minimal time period for frame synchronization received from the master time-base.

In the synchronization system of the present invention, many video cameras can be synchronized to the same master time-base by the master unit transmitting a common synchronization signal that was generated from the master time-base. This signal consist of a pulse generated by the master time-base which is used as a reference point when received by the camera. Furthermore, the phase relationship of the different video cameras in the system is not a concern because the digital memory used at the receiver can be sized accordingly to remove the time variations due to the phase differences. As such, this system will reduce cost since the memory requirements to compensate for the phase difference of video sources are no longer a complete frame of video as in traditional versions, but only the amount of memory required to compensate for the phase variations of the synchronizing pulse to each of the video cameras.

Figure 1:
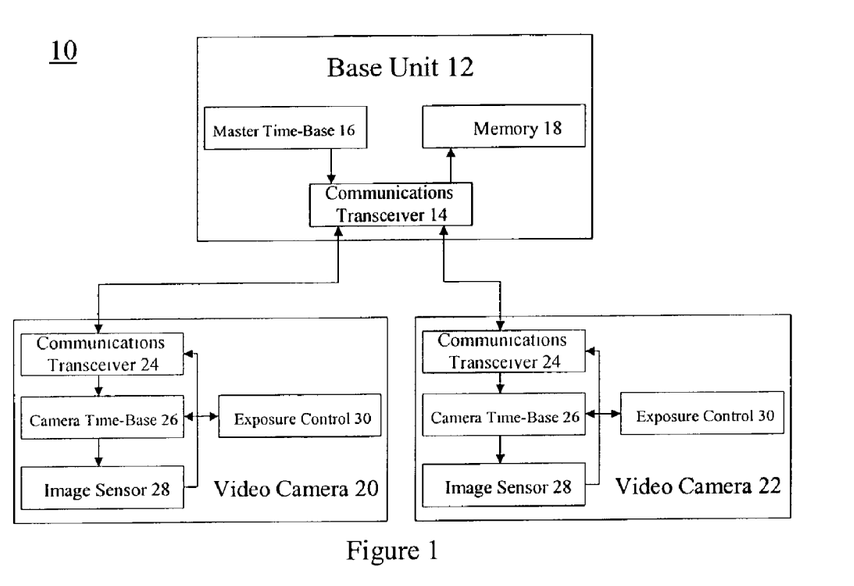
FIG. 1 illustrates a block diagram of a synchronization system in accordance with an exemplary embodiment of the present invention.

Referring now to FIG. 1, a synchronization system 10 is presented which includes a base unit 12 and video cameras 20 and 22 (although fewer and/or a greater number of video cameras can be used). The base unit contains a communications transceiver 14 that is coupled to a master time-base 16 and memory 18 while the video cameras 20 and 22 each contain a communications transceiver 24 coupled to the communications transceiver 14 and a camera time-base 26, an image sensor 28 coupled to the camera time-base and to the communications transceiver 24, and an exposure control 30 coupled to the camera time-base 26.

The master time-base 16 is adapted to set a time period for sampling a scene (or a frame of video data) by the video camera 20 (and/or the video camera 22). A frame synchronization signal is then transmitted by the base unit's communications transceiver 14 to the video camera's communications transceiver 24 which further transmits the signal to the camera time-base 26. The camera time-base 26 uses the signal to reset itself and start its internal timing sequence. The camera time-base 26 further transmit signals to the exposure control 30 to start the exposure sequence and control a length of the exposure, and to control the image sensor 28. Such control includes transmitting timing signals to the image sensor 28 to read the video data. The image sensor 28 is readout according to the time-base 26 and the read video data from the image sensor is transmitted to the camera communications transceiver 24 for transferring to the base unit communications transceiver 14. The base unit communications transceiver 14 further transfers the read video data to the memory 18.

The master time-base 16 consists of a master clock and counters (not shown) that are used to develop a consistent time-base for the synchronization system 10. In a preferred implementation of the invention, the time-base would be 33.33 mS, which correlates to 30 frames per second of image data. This is approximately the same rate as used by NTSC video. The master time-base 16 could also be set to 40.00 mS, which correlates to 25 frames per second, as is the PAL video format. The master time-base 16, however, is not limited to these frequencies and could be set to any time-base. Further, the system 10 could be dynamic such that the master time-base 16 changes periods so that the scene-sampling rate could be altered by one central source.

Once the master time-base 16 has set the sampling frequency, it generates a synchronization pulse or signal that will be sent to the video cameras 20 and 22. The signal is transferred from the master time-base 16 to the base unit communications transceiver 14 which packetizes the sychronization data in accordance with the type of communications protocol that it is adhering to and sends the data accordingly to the video cameras 20 and 22. The video cameras 20 and 22 will each receive the synchronization signal from the network data and transfer the signal to their respective camera time-base 26. Since each of the video cameras 20 and 22 may have a different physical connection with the base unit 12, the time that one video camera receives the synchronization signal in reference to another video camera may be different. This time variation is primarily composed of the transmission lengths which will result in a small phase difference between video camera signals and can be compensated for by the memory 18 as previously described.

The video camera's time-base 26 is similar to the base unit's master time-base 16 except that the master time-base operates in a continuous mode while the video camera's time-base operates in the one-shot mode. As such, the base unit's communications transceiver 14 will continue to send out synchronizations signals at a regular period while the video cameras 20 and 22 will only operate in this one-shot mode when they receive the synchronization signal and furthermore, will perform a sequence of events which upon completion, will stop the camera time-base 26. These sequence of events, which occur in the camera time-base 26 include, for example, starting the exposure control, reading the image sensor 28, and ending the exposure control of the image sensor when commanded by the camera exposure control unit 30. Once these tasks are complete, the video cameras 20 and 22 will pause operation until the next synchronization signal is received (which can occur at anytime once the sequence of events has been completed).

The camera time-base 26 also controls the timing signals sent to the image sensor 28 to read out the video data. The read video data from the image sensor 28 is sent to the camera communications transceiver 24, which further sends it to the base unit communications transceiver 14. The data packets of video can be any size that would best optimize the system. All of the video data from each of the video cameras 20 and 22 is synchronized by their frame period. This enables the base unit 12 to process multiple video signals that are correlated on a frame basis. This feature is highly useful in a scenario that includes a video processing system that requires switching between different video sources on a periodic base. This switching typically occurs during the vertical interval of the video also known as the frame start period. If the video sources are not synchronized, then the receiving system has to find a method for phasing each of the video frames to the same phase relationship so a controller (not shown) located at a receiving system (which includes the base unit 12) can switch between one complete video frame of one source to another complete video frame of another source. Since all of the video camera frames can be synchronized, in an exemplary embodiment of this invention, a video processor (not shown) located at the receiving system requires substantially less memory and hardware to perform the most common video functions.

The exposure control unit 30 of the video camera 20 utilizes the camera time-base 26 to count the period of time required for an exposure of the image sensor 28 to occur. When the synchronization signal reaches the camera time-base 26 and is reset to a starting value, the image sensor 28 is cleared of all signals generated from light impinging on the sensor during the waiting period. This results in a new integration cycle beginning in correlation to the received synchronization signal. The duration of the integration period is stored in the exposure control 30 and is predetermined based on previous image sensor 28 video data. This stored value correlates to the time period in the camera time-base 26 when the exposure of the image sensor 28 (integration period) should occur. The exposure control 30 monitors the camera time-base 26 until it reaches such value and sends a signal to the camera time-base to start the exposure of the image sensor 28. This is accomplished by stopping the clearing of the image sensor 28. At this time the image sensor 28 is no longer cleared and the exposure can begin. The exposure period ends after the complete previous image stored in a memory of the image sensor 28 is read out because transferring the image into the memory stops the exposure. If the memory was not cleared then the old data and new data would be combined.

Figure 2:
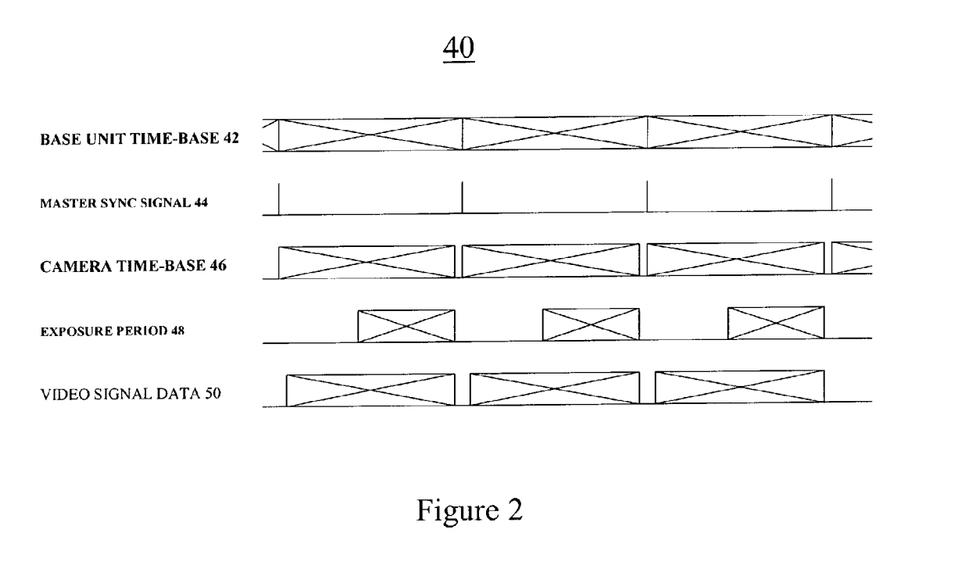
FIG. 2 illustrates timing sequences of a video camera and a base unit of the synchronization system in accordance with an exemplary embodiment of the present invention.

Referring now to FIG. 2, timing sequences 40 of a video camera and a base unit of the synchronization system 10 are presented. The timing sequences 40 include a base unit time-base signal 42 which indicates that the base unit master time-base 16 is operating continuously during the operation of the system 10. The base unit time-base signal 42 consists of a frame period in which the operations of the base unit 12 repeat and correlate to the desired frame rate of the video signal. A master sync signal 44, which is a periodic signal, is transmitted to the cameras 20 and 22 and is generated on a frame basis from the base unit master time-base 16. The camera time-base 26 receives the master sync signal 44 and operates for a predetermined period of time which is less than the period of the master sync signal. During this period of time, the camera time-base 26 communicates with the camera exposure control 30 to set the exposure period 48 of the image sensor 28. The exposure period 48 starts during the camera time-base 26 operation but varies the starting point in time to vary the exposure period. The end of the exposure period 48 is a consistent point set by the camera time-base 26. Concurrent with and controlled by the camera time-base 26, video signal data 50 is generated by the image sensor 28 and sent to the communications transceiver 24. The video signal data 50 is controlled by the camera time-base 26 and occurs during a period of the camera time-base signal 46.

Figure 3:
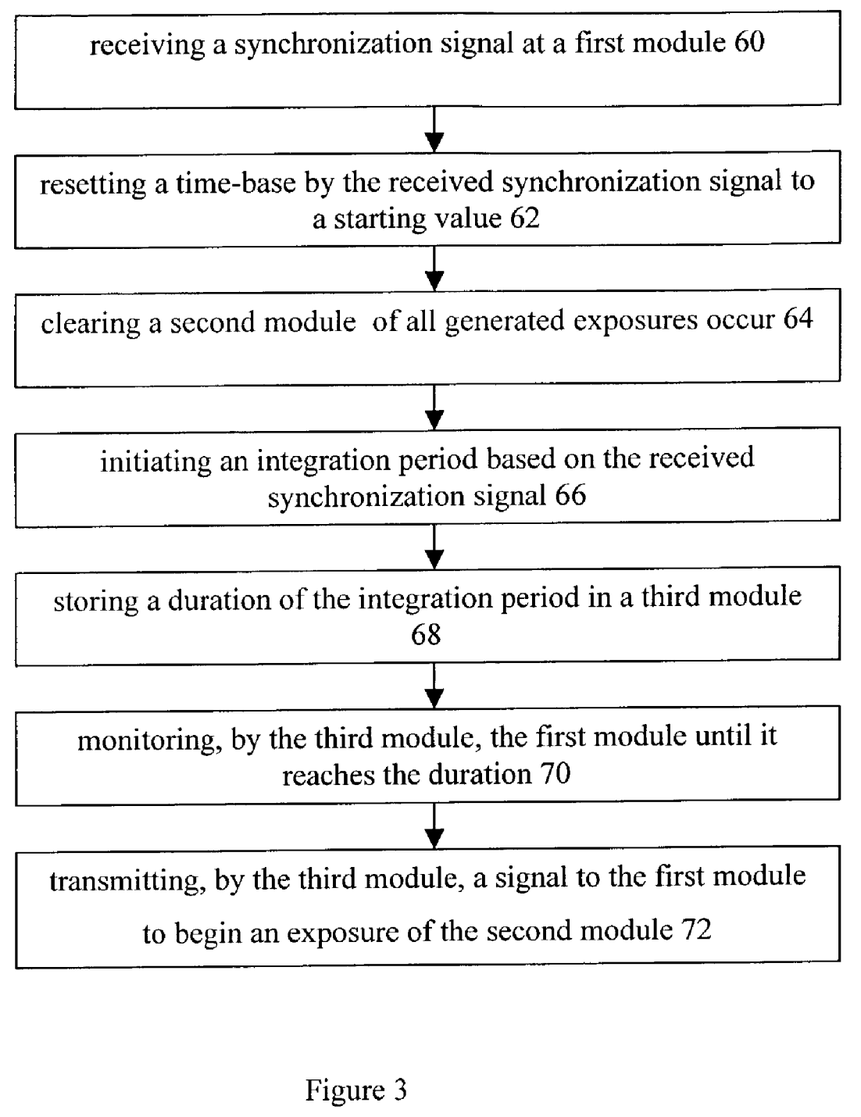
FIG. 3 illustrates a flow chart for generating exposures via a video camera in accordance with an exemplary embodiment of the present invention.

Referring now to FIG. 3, a method for generating exposures via a video camera is presented. The method begins by receiving a synchronization signal at a first module (such as the camera time-base 26) at step 60. Resetting a time-base of the first module by the received synchronization signal to a starting value and clearing a second module (such as the image sensor 28) of all generated exposures occur, respectively, at steps 62 and 64. The method proceeds, respectively, by initiating an integration period based on the received synchronization signal and storing a duration of the integration period in a third module (such as the exposure control 30) at steps 66 and 68. Monitoring, by the third module, the first module until it reaches the duration and, when the duration is reached, transmitting, by the third module, a signal to the first module to begin an exposure of the second module occur, respectively at steps 70 and 72. Other steps include stopping the clearing of the second module to begin the exposure of the second module. The duration of the integration period correlates to a time period in the first module when the exposure of the second module should occur and/or is based on previously generated exposures. The beginning of the exposure of the second module ends after the previously generated exposures are read.

Figure 4:
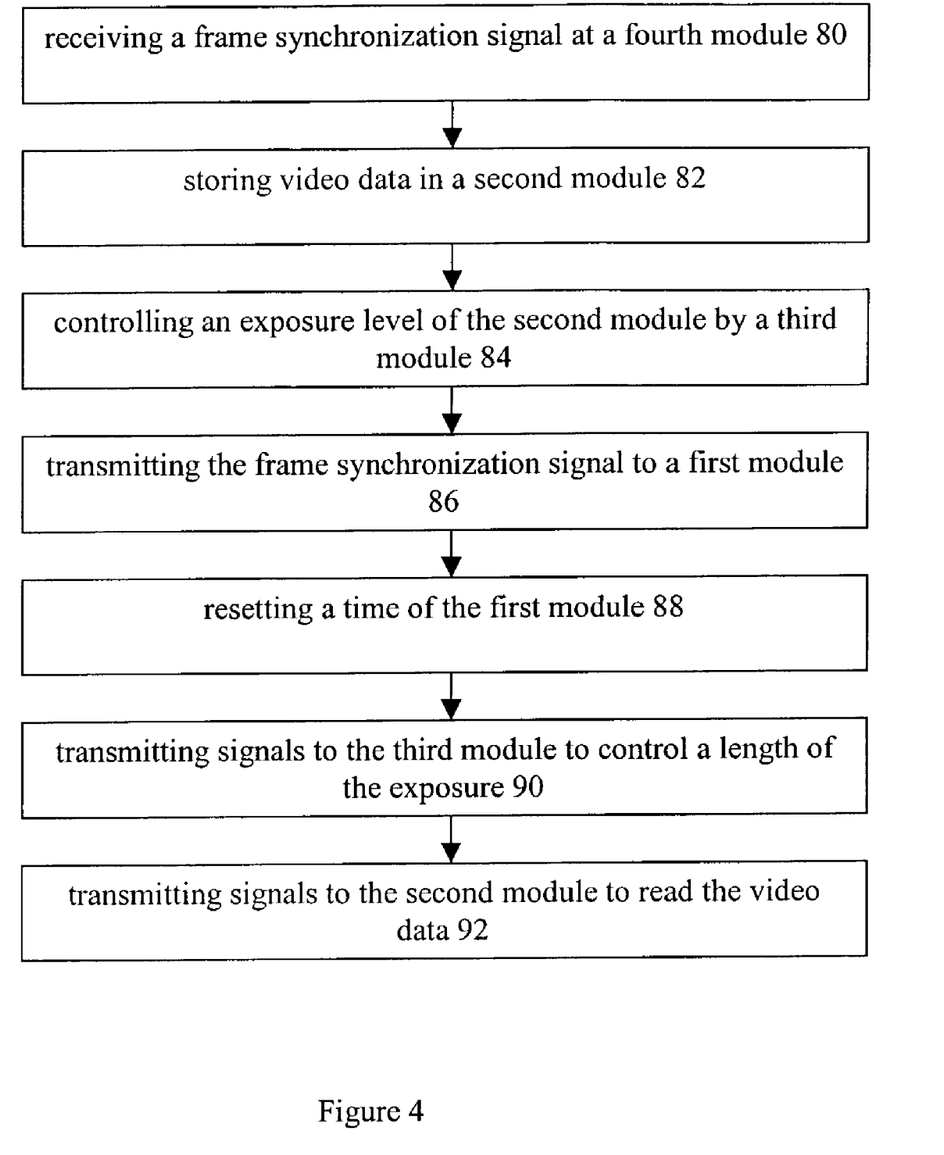
FIG. 4 illustrates a flow chart for synchronization in accordance with an exemplary embodiment of the present invention.

Referring now to FIG. 4, a method for synchronization is presented. The method begins by receiving a frame synchronization signal at a fourth module (such as the video camera communications transceiver 24) at step 80. Storing video data in a second module and controlling an exposure level of the second module by a third module occur, respectively, at steps 82 and 84. The method proceeds, respectively, at steps 86 and 88 by transmitting the frame synchronization signal to a first module and resetting a time of the first module. Transmitting signals to the third module to control a length of the exposure and to the second module to read the video data occur at steps 90 and 92, respectively.

Figure 5A:
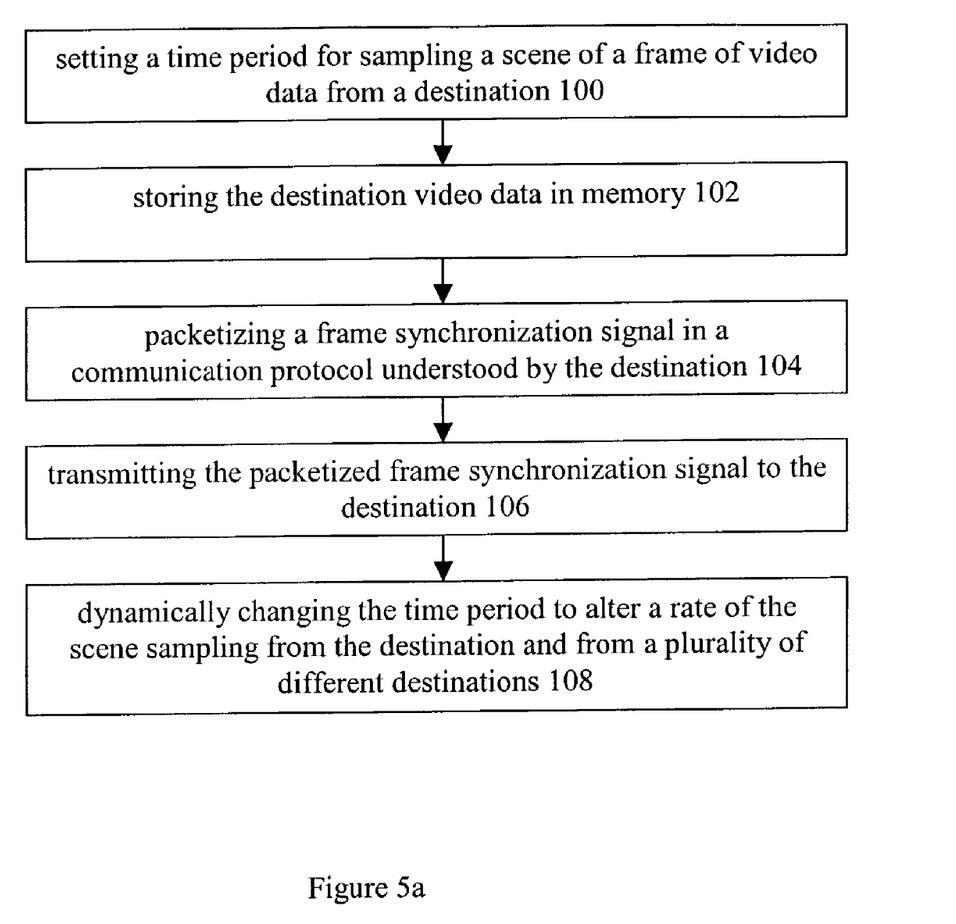
FIGS. 5a, 5b, and 5c illustrate flow charts for performing certain instructions by a computer readable medium in accordance with an exemplary embodiment of the present invention.
Figure 5B:
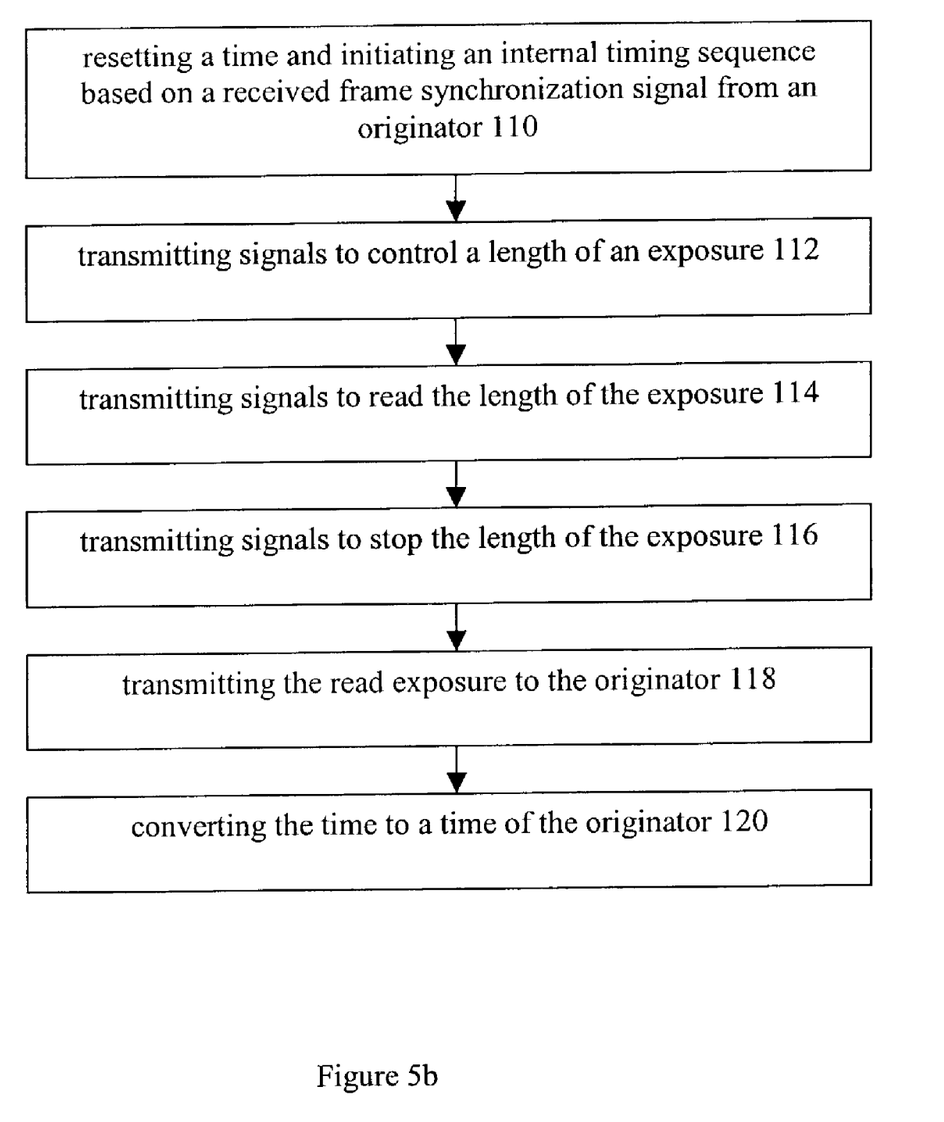
Figure 5C:
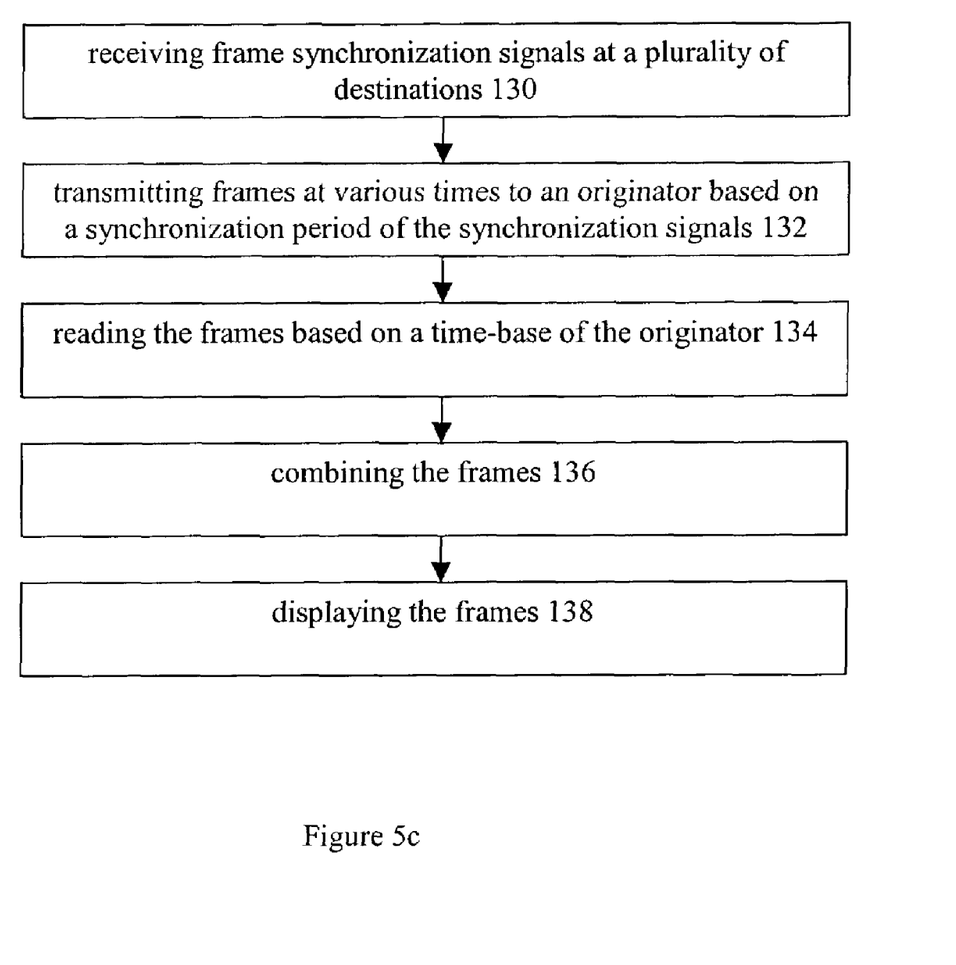

Referring now to FIGS. 5*a-c*, instructions performed by a computer readable medium are presented. The computer readable medium may be a processor (not shown) in the base unit 12 and/or the video cameras 20 and 22, and the instructions may be stored in the base unit memory 18 and/or in a video camera memory (not shown). The instructions performed by the computer readable medium of FIG. 5*a* include setting a time period for sampling a scene of a frame of video data from a destination at step 100, storing the destination video data in memory at step 102, packetizing a frame synchronization signal in a communication protocol understood by the destination at step 104, transmitting the packetized frame synchronization signal to the destination at step 106, and dynamically changing the time period to alter a rate of the scene sampling from the destination and from a plurality of different destinations at step 108.

The instructions performed by the computer readable medium of FIG. 5*b* include resetting a time and initiating an internal timing sequence based on a received frame synchronization signal from an originator at step 110, transmitting signals to control a length of an exposure, to read the length of the exposure, and to stop the length of the exposure at steps 112-116 respectively, transmitting the read exposure to the originator at step 118 and converting the time to a time of the originator at step 120.

The instructions performed by the computer readable medium of FIG. 5*c* include receiving frame synchronization signals at a plurality of destinations at step 130, transmitting frames at various times to an originator based on a synchronization period of the synchronization signals at step 132, reading the frames based on a time-base of the originator at step 134, and combining and displaying the frames, respectively, at steps 136 and 138.

Although an exemplary embodiment of the system and method of the present invention has been illustrated in the accompanied drawings and described in the foregoing detailed description, it will be understood that the invention is not limited to the embodiments disclosed, but is capable of numerous rearrangements, modifications, and substitutions without departing from the spirit of the invention as set forth and defined by the following claims. For example, the exposure level of the image sensor can be controlled by controlling the amount of light impinging on the image sensor by a mechanical shutter control. Further, the base unit communications transceiver 14 may transfer the read video data for immediate display or to the memory 18 for future display.

What we claim is:

1. A synchronization system for a plurality of video cameras comprising:
   a base unit, including:
      a master time-base adapted to generate a master synchronization signal defining a frame period within which a frame of video data is captured;
      a base unit communications transceiver adapted to transmit the frame synchronization signal; and
   a video camera, including:
      a video camera communications transceiver adapted to receive the frame synchronization signal from the base unit and transmit video data to the base unit;
      a camera time-base adapted to reset a camera time-base value in response to reception of the frame synchronization signal and wherein the camera time-base is configured to operate during a camera time-base period following said reset wherein the camera time-base period is less than the frame period;
      an image sensor adapted to store video data; and
      an exposure controller adapted to monitor a value of the camera time-base and, upon detecting the value of the camera time-base matching a predetermined value, initiate exposure of the image sensor.

2. The synchronization system of claim 1, wherein the base unit further includes a memory and wherein the camera time-base is further adapted to control the image sensor to read the video data and transmit the read video data to the memory.

3. The synchronization system of claim 2, wherein the camera time-base is adapted to end the exposure period when transmission of the read video data to the base unit communications transceiver completes.

4. The synchronization system of claim 2, wherein timing signals associated with the received read video data are converted to timing signals of the master time-base when the memory receives the read video data.

5. The synchronization system of claim 2, wherein a time period to complete reading the frame of video data is less than the frame synchronization period.

6. The synchronization system of claim 1, further comprising a plurality of video cameras, wherein the base unit communications transceiver is adapted to send a plurality of frame synchronization signals to a plurality of video camera communications transceivers.

7. The synchronization system of claim 1, wherein the camera time-base is further adapted to control the exposure controller to terminate exposure of the image sensor, and wherein neither the initiation nor the termination of the exposure coincide with the frame synchronization signal.

8. A video camera comprising:
   an image sensor adapted to store video data;
   a communications transceiver adapted to receive a frame synchronization signal from a base unit and transmit video data to the base unit;
   a camera time-base adapted to reset a time-base value in response to receiving the frame synchronization signal and wherein the camera time-base is configured to operate during a camera time-base period following said reset and terminate operation when the camera time-base period expires; and
   an exposure controller adapted to monitor a value of the camera time-base and, upon detecting the value of the camera time-base matching a first predetermined value, initiate exposure of the image sensor, and, upon detecting the end of the camera time-base period, terminate exposure of the image sensor.

9. The video camera of claim 8, wherein the camera time-base is further adapted to control the exposure controller to terminate exposure of the image sensor, and wherein neither the initiation nor the termination of the exposure coincide with the frame synchronization signal.

10. An operational method for a video camera, comprising:
   responsive to receiving a frame synchronization signal from a base unit, resetting a value of a time-base and initiating a time-base period;
   responsive to detecting the value of the time-base matching a predetermined value stored in an exposure controller, initiating exposure of an image sensor;
   initiating a reading of video data stored in the image sensor at least partially during said exposure of said image sensor; and
   responsive to detecting at least one of a completion of said exposure of said image sensor and the value of the time-base reaching a predetermined maximum value, terminating the exposure of the image sensor.

* * * * *